(12) United States Patent
Mathur et al.

(10) Patent No.: US 7,696,138 B2
(45) Date of Patent: Apr. 13, 2010

(54) ALKYL ACRYLATE COPOLYMER DISPERSANTS AND USES THEREOF

(75) Inventors: Naresh C. Mathur, Midlothian, VA (US); John T. Loper, Richmond, VA (US); Akhilesh Duggal, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 254 days.

(21) Appl. No.: 11/764,253

(22) Filed: Jun. 18, 2007

(65) Prior Publication Data

US 2008/0026972 A1 Jan. 31, 2008

Related U.S. Application Data

(63) Continuation-in-part of application No. 11/494,598, filed on Jul. 28, 2006.

(51) Int. Cl.
    C10M 149/00 (2006.01)
    C10M 159/12 (2006.01)
    C08F 20/10 (2006.01)

(52) U.S. Cl. ............... 508/470; 508/452; 508/454; 508/455; 508/471; 508/472; 525/330.3; 525/330.5

(58) Field of Classification Search ............... 508/470, 508/452, 454, 459, 545; 524/184, 186; 525/330.3
    See application file for complete search history.

(56) References Cited

U.S. PATENT DOCUMENTS

| | | | |
|---|---|---|---|
| 3,048,487 A | 8/1962 | Minsk et al. | |
| 3,576,743 A * | 4/1971 | Widmer | 508/240 |
| 4,482,464 A | 11/1984 | Karol et al. | |
| 4,668,412 A | 5/1987 | Hart et al. | |
| 4,863,623 A | 9/1989 | Nalesnik | |
| 5,055,213 A | 10/1991 | Germanaud et al. | |
| 5,075,383 A | 12/1991 | Migdal et al. | |
| 5,409,623 A | 4/1995 | Mishra et al. | |
| 5,498,809 A * | 3/1996 | Emert et al. | 585/13 |
| 5,837,773 A | 11/1998 | Olivier et al. | |
| 6,025,308 A * | 2/2000 | Matsuya et al. | 508/235 |
| 6,107,257 A | 8/2000 | Valcho et al. | |
| 6,117,825 A | 9/2000 | Liu et al. | |
| 6,133,210 A | 10/2000 | Tipton | |
| 6,255,261 B1 | 7/2001 | Liesen et al. | |
| 6,358,892 B1 * | 3/2002 | Harrison et al. | 508/192 |
| 6,746,993 B2 | 6/2004 | Yuki et al. | |
| 2003/0036488 A1 | 2/2003 | Yuki et al. | |
| 2004/0038836 A1 | 2/2004 | Devlin et al. | |
| 2008/0026964 A1 | 1/2008 | Srinivasan et al. | |
| 2008/0027181 A1 | 1/2008 | Loper et al. | |

* cited by examiner

*Primary Examiner*—Ellen M McAvoy
*Assistant Examiner*—Pamela Weiss
(74) *Attorney, Agent, or Firm*—Luedeka, Neely & Graham, PC

(57) ABSTRACT

A novel reaction product and method for making the reaction product. The reaction product is a copolymer obtained by reacting together i) an acylated alkylacrylate copolymer having a number average molecular weight ranging from about 5,000 to about 500,000; ii) a hydrocarbyl acylating agent having a number average molecular weight ranging from about 500 to about 5000; and iii) a compound selected from the group consisting of (a) a polyamine; (b) a polyol; and (c) an aminoalcohol to provide a functionalized polyalkylacrylate copolymer. According to the reaction, a mole ratio of component (i) to (ii) ranges from about 1:10 to about 5:1.

40 Claims, No Drawings

US 7,696,138 B2

ALKYL ACRYLATE COPOLYMER DISPERSANTS AND USES THEREOF

RELATED APPLICATIONS

This application is a continuation-in-part of application Ser. No. 11/494,598, filed Jul. 28, 2006, now pending and is related to application Ser. No. 11/494,524, filed Jul. 28, 2006.

TECHNICAL FIELD

The disclosure relates to a lubricant additive useful as an improved dispersant when employed in a lubricating oil composition.

BACKGROUND AND SUMMARY

Dispersant additives are used to suspend oil-insoluble resinous oxidation products and particulate contaminants in the bulk oil. Ideally, this minimizes sludge formation, particulate-related wear, viscosity increase, and oxidation-related deposit formation. Dispersants are primarily used in gasoline engine and heavy-duty diesel engine oils. They are also used in natural gas engine oils, aviation piston engine oils, automatic transmission fluids and some types of gear lubricants. A variety of commercial dispersant additives have been available and used. For instance, N-substituted long-chain alkenyl succinimides have been used as ashless dispersants. An alkenylsuccinic acid intermediate is obtained by condensing an olefin polymer, such as polyisobutylene, with maleic anhydride. A basic part of the dispersant additive has then been obtained, e.g., from reacting the intermediate with amine compounds such as polyamines. Other previously used dispersants include high molecular weight esters, e.g., a reaction product of an alkylene glycol and a substituted succinic anhydride. Other known dispersants include Mannich bases obtained from high molecular weight alkylated phenols, such as, e.g., the reaction product of a polyalkylenephenol, polyalkylenepolyamine, and an aldehyde. Oil chemists are continually searching for dispersants that achieve optimum dispersancy and low-temperature performance at low concentrations. The present disclosure addresses the need for improved dispersants for lubricating oils and fluids.

An exemplary embodiment of the disclosure is directed to a novel reaction product and method for making the reaction product. The reaction product is a copolymer product obtained by reacting together i) an acylated alkylacrylate copolymer having a number average molecular weight ranging from about 5,000 to about 500,000; ii) a hydrocarbyl acylating agent having a number average molecular weight ranging from about 500 to about 5000; and iii) a compound selected from the group consisting of (a) a polyamine; (b) a polyol; and (c) an aminoalcohol to provide a functionalized polyalkylacrylate copolymer. In several embodiments the mole ratio of (i):(ii) ranges from about 1:10 to about 5:1. An example of a suitable range for the mole ratio of (i) to (ii) includes about 1:1 to 1:3.

In another exemplary embodiment, a reaction product is obtained by reacting together i) an acylated alkylacrylate copolymer having a weight average molecular weight ranging from about 5,000 to about 500,000; ii) a polyalkylene succinic acid or anhydride; and iii) a compound selected from (a) a polyamine; (b) a polyol; and (c) an aminoalcohol to provide a functionalized polyalkylacrylate copolymer, wherein a mole ratio of (i) to (ii) ranges from about 1:10 to about 5:1.

Among other advantages, the copolymer reaction products made according to the disclosed embodiments may have good dispersancy, thickening efficiency, low temperature properties, soot handling properties, fuel economy, and/or antioxidancy properties, and are substantially devoid of gels. The reaction products have improved low temperature properties and are useful in crankcase formulation packages, amongst other applications. Some necessary components within traditional lubricating oil, such as friction modifiers and grade of base oil, have generally tended to improve a formulation's low temperature properties. However, other components such as certain polymers, such as polyisobutylene-based dispersants, have been observed to negatively impact an oil formulation's low temperature properties. Although the use of a higher grade of base oil (e.g., Group II+ or Group III) in a formulation can improve an oil's fuel economy, these higher grades of base oil require more complex refinery processing, and thus add more cost to the resulting oil formulation. It has been discovered that the reaction product additives having improved low temperature properties according to disclosed embodiments may reduce or eliminate the need to use expensive base oils in lubricant formulations.

The reaction products described herein may also be used in engine oil applications to improve or boost dispersancy, oxidation, high temperature high shear (HTHS)/fuel economy, and low temperature viscometrics (e.g., cold cranking simulator (CCS) and mini-rotary viscometer (MRV) properties) in conjunction with conventional dispersants and at a lower olefin copolymer (OCP) loading in the finished oil. Particularly, the disclosed reaction products may exhibit outstanding low temperature properties in lubricating oils for applications such as crankcase lubricants and automatic transmission fluids. The reaction products may also exhibit excellent low temperature performance in a wide variety of base oils. Improved fuel economy, such as measured via Sequence VIB engine testing, may also be obtained with oils containing the reaction products embodied herein.

The reaction products may also be precipitation- or sedimentation-resistant, and may not cause or encourage such formations in finished fluids incorporating the reaction products. The reaction products may be further characterized as polymer bound antioxidants having a potential to enhance the oxidative stability and dispersancy of lubricants which may be limited by the thermal and oxidative stability of conventional lower molecular weight antioxidants.

DETAILED DESCRIPTION OF THE PREFERRED EMBODIMENTS

The reaction products may be characterized as random copolymers derived from components (i), (ii) and (iii) as described herein. As used herein, the term "copolymer" means a polymer having more than one type of repeating unit and includes, for example, oligomers, copolymers, terpolymers, and tetrapolymers.

Component (i) of the reaction product is the acylated alkylacrylate copolymer that may be provided by reacting one or more first set of monomers with a second set of monomers in the presence of a free-radical initiator, optionally in the presence of suitable chain transfer agents, to provide the acylated alkylacrylate copolymer of the reaction mixture. The first set of monomers may comprise three subgroups of alkyl(alkyl)acrylate monomers having general structure:

wherein R¹ may be hydrogen or alkyl, and X is a C1 to about C30 hydrocarbyl group. In a particular embodiment, general structure represents an alkyl(alkyl)acrylate in which X represents a non-substituted or substituted n-alkyl group with the proviso that the alkyl acrylate monomer reactant include a first subgroup of alkyl(alkyl)acrylates having 1 to 7 carbon atoms and preferably 1 to 4 carbon atoms in the terminal alkyl group X (i.e., the "short" chain length group), a second subgroup thereof having 8 to 16 carbon atoms in alkyl group X (i.e., the "medium" chain length group), and a third subgroup thereof having 17 to 30 carbon atoms in alkyl group X (i.e., the "long" chain length group). The gravimetric ratio of the three subgroups, i.e., short/medium/long, of alkyl acrylate monomers ("AAM's") in the first monomer may range from about 5:95:0.05 to about 35:55:10, respectively. That is, generally about 5 to about 35 wt % short chain AAMs, about 95 to about 55 medium chain AAM's, and about 0.05 to about 10 wt % long chain AAM's may be included in the first monomer of component (i).

In a particular embodiment, a first monomer for component (i) of the reaction mixture may comprise acrylates or their acids having general structure 1a:

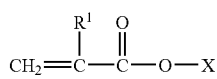

1a wherein R¹ may be hydrogen or alkyl, and X represents a non-substituted or substituted n-alkyl group with the proviso that the alkyl acrylate monomer reactant includes a first subgroup of alkyl(alkyl)acrylates where X is an alkyl group having 1 to 7 carbon atoms and preferably 1 to 4 carbon atoms (i.e., the "short" chain length group), a second subgroup where X has 8 to 16 carbon atoms (i.e., the "medium" chain length group), and a third subgroup where X has 17 to 30 carbon atoms (i.e., the "long" chain length group). The gravimetric ratio (i.e., a wt:wt:wt percentage basis) of the three subgroups, i.e., short/medium/long of alkyl acrylate monomers used to provide the first reaction component may range from about 5:95:0.05 to about 35:55:10, respectively. Substituted alkyl groups may include, e.g., an epoxy functional alkyl group, a keto functional alkyl group, or an aminoalkyl group. For purposes herein, the term "alkyl(alkyl)acrylate" generally refers to esters of alkyl(alkyl)acrylic acids and/or the precursor acids per se, which may be further defined or qualified within a particular context herein.

Substituted alkyl groups may include, e.g., an epoxy functional alkyl group, a keto functional alkyl group, or an aminoalkyl group.

In a particular embodiment, the first monomer comprises three subgroups of alkyl(alkyl)acrylates having general structure 2a:

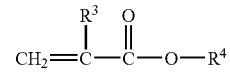

2a where R³ is hydrogen or a C1-C5 alkyl group, and R⁴ is a non-substituted or substituted C1 to about C30 alkyl group with the proviso that the alkyl(alkyl)acrylate monomer includes three different subgroups comprising a first subgroup of alkyl(alkyl)acrylates in which R⁴ is an alkyl group having 1 to 4 carbon atoms, a second subgroup in which R⁴ is an alkyl group having 8 to 16 carbon atoms, and a third subgroup in which R⁴ is an alkyl group having 17 to 30 carbon atoms.

In one embodiment, the alkyl(alkyl)acrylate may comprise C1 to about C30 alkyl(meth)acrylate, where the "C1 to about C30 alkyl" portion of the named compound corresponds to R⁴ in above general structure 2a. This alkyl(meth)acrylate is an alkyl ester of acrylic or methacrylic acid having a straight or branched alkyl group of 1 to 30 carbon atoms per group. In this regard, and with reference to structure 2a, the terminology "alkyl(alkyl)acrylate" occasionally may be applied herein for sake of convenience to more specifically identify the R⁴ group (corresponding to the first-mentioned alkyl group) as well as the R³ group (corresponding to the second-mentioned alkyl group) portions of the named acrylate compound.

Non-limiting examples of the first monomer include, e.g., methyl (meth)acrylate, ethyl(meth)acrylate, propyl(meth)acrylate, butyl(meth)acrylate, pentyl(meth)acrylate, hexyl (meth)acrylate, heptyl(meth)acrylate, octyl(meth)acrylate, nonyl(meth)acrylate, decyl(meth)acrylate, undecyl(meth)acrylate, lauryl(meth)acrylate, myristyl(meth)acrylate, dodecyl pentadecyl methacrylate, stearyl(meth)acrylate, cetyl (meth)acrylate, heptadecyl(meth)acrylate, nonadecyl(meth)acrylate, eicosyl(meth)acrylate, heneicosyl methacrylate, docosyl methacrylate, glycidyl(meth)acrylate, and aminopropyl(meth)acrylate, and blends, mixtures and combinations thereof The first monomer also may have structure 2:

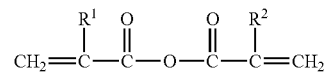

2 where R¹ and R² have the same meanings as described above.

The alkyl(meth)acrylate monomers generally may be prepared by standard esterification procedures using technical grades of aliphatic alcohols. Individual alkyl(meth)acrylates or mixtures thereof may be used. Those skilled in the art will appreciate that minor levels of other monomers, polymerizable with the alkyl(meth)acrylates disclosed herein, may be present as long as they do not adversely affect the dispersancy and low temperature properties of the fully formulated fluids, for example, increasing the low temperature pumping viscosity of a lubricating fluid when dispersant is used in combination with a VI improver, etc. Typically additional monomers are present in an amount of less than about 5 weight percent, preferably in an amount of less than 3 weight percent, most preferably in an amount of less than 1 weight percent. For example, the addition of minor levels of monomers such as nitrogen-containing alkyl(meth)acrylates, hydroxy- or alkoxy-containing alkyl(meth)acrylates, ethylene, propylene, styrene, vinyl acetate and the like are contemplated within the scope of disclosed embodiments as long as the presence of these monomers do not materially increase the polarity of the copolymers.

The second monomer used in making the acylated alkylacrylate copolymer component may comprise an unsaturated monocarboxylic acid anhydride, an unsaturated dicarboxylic acid anhydride, or corresponding acid thereof, which may be selected, for example, from the group consisting of maleic anhydride, itaconic anhydride, halomaleic anhydride, alkylmaleic anhydride, maleic acid, and fumaric acid, and combinations and derivatives thereof. Suitable second monomers particularly may include unsaturated dicarboxylic acid anhydrides and their corresponding acids, more particularly those having the general formula A1, B1, C1 or D1:

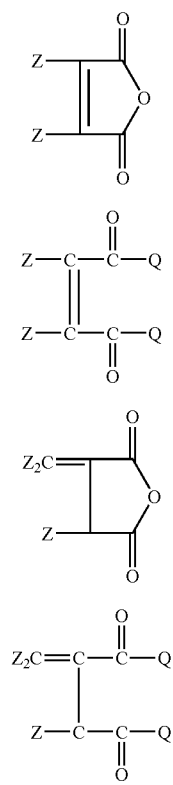

wherein Z is preferably hydrogen but may also be an organic group such as a branched or straight chain alkyl group, an anhydride, a ketone group, a heterocyclic group or other organic group containing 1-12 carbon atoms. In addition, Z may be a halogen such as chlorine, bromine or iodine. Q can be OH or an alkoxy group containing 1-8 carbon atoms. Maleic anhydride and itaconic anhydride, and/or their corresponding acids, are particularly suitable. The base polymer may comprise monomeric units derived from about 99.9 to about 80 weight percent of alkyl acrylate monomers and about 0.1 to about 20 weight percent olefinic acylating agent monomers. The resulting copolymer may have a weight average molecular weight ranging from about 5,000 to about 500,000 as determined by gel permeation chromatography.

Suitable second set monomers may be selected, for example, from the group consisting of maleic anhydride, itaconic anhydride, halomaleic anhydride, alkylmaleic anhydride, maleic acid, and fumaric acid, and combinations and derivatives thereof. Examples of these monomers are set forth, for example, in U.S. Pat. No. 5,837,773, which descriptions are incorporated herein by reference. Maleic anhydride or a derivative thereof is generally most preferred due to its commercial availability and ease of reaction. In the case of unsaturated ethylene copolymers or terpolymers, itaconic acid or its anhydride is preferred due to its reduced tendency to form a cross-linked structure during the free-radical copolymerization process. The ethylenically unsaturated carboxylic acid materials typically may provide one or two carboxylic groups per mole of reactant to the polymer.

For dispersant applications, it is preferred that the acylated alkylarcylate copolymer have a number average molecular weight (Mw) ranging from about 5,000 to about 500,000, more typically from about 50,000 to about 250,000, as determined by gel permeation chromatography. The acylated alkylacrylate copolymer may also have a polydispersity index value of about 1.0 to about 3.

A second component used to make the functionalized polyalkylacrylate copolymer may be selected from a hydrocarbyl acylating agent. The hydrocarbyl acylating agent may be an acylating agent, as described above that is substituted with a hydrocarbyl group having a number average molecular weight ranging from about 500 to about 5000, typically, from about 900 to about 3000. The hydrocarbyl group of the hydrocarbyl acylating agent may be a substituted or unsubstituted oxyalkylene or a polyolefin. Suitable hydrocarbyl groups include polymers comprising a major molar amount of ($C_2$-$C_{10}$)polymer, e.g., a ($C_2$-$C_5$)monoolefin. Such olefins include ethylene, propylene, butylene, isobutylene, pentene, 1-octene, styrene, etc. The polymers may be homopolymers such as polyisobutylene, as well as copolymers of two or more of such olefins such as copolymers of: ethylene and propylene, butylene and isobutylene, propylene and isobutylene, etc. Other copolymers include those in which a minor molar amount of diolefin monomers e.g., 1 to 10 mole % is a ($C_4$-$C_{10}$)diolefin, e.g., isoprene, butadiene, and 1,4-hexadiene; etc. Non-limiting examples of hydrocarbyl substituted acylating agents include, but are not limited to, alpha- or beta-unsaturated ($C_4$-$C_{10}$)dicarboxylic acid, anhydride or ester thereof, such as fumaric acid, itaconic acid, maleic acid, maleic anhydride, chloromaleic acid, dimethylfumarate, chloromaleic anhydride, maleic anhydride grafted olefinic copolymers, and mixtures thereof. Specific examples include, polyisobutylene succinic acid, polyisobutylene succinic anhydride, polybutene succinic acid, and polybutene succinic anhydride.

The hydrocarbyl acylating agent may be characterized by the following formula 3

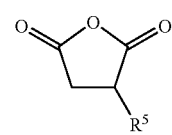

3 where $R^5$ may be a residue (containing residual unsaturation) from a polyolefin which was reacted with maleic acid anhydride to form the alkenyl succinic acid anhydride. $R^5$ may have a number average molecular weight (Mn) ranging from about 500 to about 10,000, preferably from about 1000 to about 5000, and more preferably from about 1000 to about 2500.

In the reaction product, component (i) and component (ii) of the reaction product may be cross-linked by reaction with component (iii). Accordingly, dicarboxylic acid or anhydride equivalents in components (i) and (ii) per mole of component (iii) may range from about 1:1 to about 3:1 dicarboxylic acid or anhydride equivalents per mole of component (iii). Component (iii) may be selected from a wide variety of suitable cross-linking agents. Compounds suitable for use as component (iii) may include polyamine, polyols, and aminoalcohols.

The polyamines may be hydrocarbyl amines that have at least one primary nitrogen atom. A polyamine substituted with —OH groups or alkoxy groups or polyoxyalkylene groups may also be used as component (iii). Examples of hydrocarbyl amines include but are not limited to, alkyl polyamines such as polyalkylene polyamines, polyisobutyl amines, fatty polyamines, fatty alkyl ether polyamines, and aryl polyamines such as phenylene diamines. The fatty alkyl ether polyamines may be, for example, $C_{10-20}$ alkyloxyalkyl polyamines.

The polyalkylene polyamines may be selected from, diethylenetriamine (DETA), triethylenetetramine (TETA), tetraethylenepentamine (TEPA), pentaethylenehexamine (PEHA), dipropylenetriamine (DPTA), bis(hexamethylene) triamine, 1,3,6-trisaminomethylcyclohexane (TMAH), trimethylhexamethylenediamine (TMD), diethylaminopropylamine (DEAPA), 1,4-bis(3-aminopropyl)piperazine, ethylene diamine, dimethylamino propylamine, and N-hydroxyethyl ethylenediamine.

The aromatic polyamine may be selected from compounds such as described, e.g., in U.S. Pat. Nos. 4,482,464, 4,863,623, 5,075,383, 6,107,257, and 6,117,825, which descriptions are incorporated herein by reference. Specific examples of aryl polyamines include N-phenyl-phenylene diamine, N-naphthyl-phenylene diamine, and substituted forms thereof as represented by the formula:

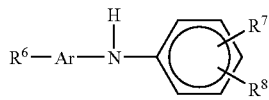

in which Ar is an aromatic group, $R^6$ is H, —$NH_2$, —NH-aryl, —NH-ary-alkyl, —NH-alkyl, or a branched or straight chain radical having 4 to 24 carbon atoms that can be alkyl, alkenyl, alkoxy, aryalkyl, hydroxyalkyl, aminoalkyl, $R^7$ is —$NH_2$, —$NH(CH_2)_n)_mNH_2$, —$CH_2$—$(CH_2)_n$—$NH_2$, -aryl-$NH_2$ in which n and m have a value from 1-10, and $R^8$ is —H, alkyl, alkenyl, alkoxy, aralkyl, alkaryl having 4 to 24 carbon atoms and with the proviso that at least $R^6$ or $R^7$ must have a terminal $NH_2$. Particular aromatic amines for use in the present invention are the phenylenediamines and N-arylphenylenediamines, more specifically the N-phenylphenylenediamines, for example, N-phenyl-1,4-phenylenediamine, N-phenyl-1,3-phenylenediamine, N-phenyl-1,2-phenylenediamine, and 4,4-diaminodiphenylamine, or salts thereof.

The aromatic amine may also be an amine comprising two linked aromatic moieties. By the term "aromatic moiety is meant to include both mononuclear and polynuclear groups. The polynuclear groups can be of the fused type wherein an aromatic nucleus is fused at two points to another nucleus such as found in naphthyl or anthranyl groups. The polynuclear group can also be of the linked type wherein at least two nuclei (either mononuclear or polynuclear) are linked through bridging linkages to each other. These bridging linkages can be chosen from, among others known to those skilled in the art, alkylene linkages, ether linkages, ester linkages, keto linkages, sulfide linkages, polysulfide linkages of 2 to 6 sulfur atoms, sulfone linkages, sulfonamide linkages, amide linkages, azo linkages, and direct carbon-carbon linkages between the groups without any intervening atoms. Other aromatic groups include those with heteroatoms, such as pyridine, pyrazine, pyrimidine, and thiophene. Examples of the aromatic groups that are useful herein include the aromatic groups derived from benzene, naphthalene, and anthracene, preferably benzene. Each of these various aromatic groups may also be substituted by various substituents, including hydrocarbyl substituents.

The aromatic amine may be an amine comprising two aromatic moieties linked by an —O— group. An example of such an amine is phenoxyphenylamine, also known as phenoxyaniline or aminophenyl phenyl ether, which can be represented by and its various positional isomers (4-phenoxy, 3-phenoxy, and 2-phenoxy-aniline). Either or both of the aromatic groups can bear substituents, including hydrocarbyl, amino, halo, sulfoxy, hydroxy, nitro, carboxy, and alkoxy substituents. The amine nitrogen may be a primary amine nitrogen, as shown, or it can be secondary, that is, bearing a further substituent such as hydrocarbyl, preferably short chain alkyl such as methyl. In one embodiment, the aromatic amine is the unsubstituted material shown above.

The aromatic amine may be an amine comprising two aromatic moieties linked by an —N=N— group, i.e., an azo group. These materials are described in greater detail in U.S. Pat. No. 5,409,623, which description is incorporated herein by reference. In one embodiment the azo-linked aromatic amine is represented by the formula that is 4-(4-nitrophenylazo)aniline, as well as positional isomers thereof.

The aromatic amine may be an amine comprising two aromatic moieties linked by a —C(O)NR— group, that is an amide linkage, where R is hydrogen or hydrocarbyl. Each group may be substituted as described above for the oxygen-linked and the azo-linked amines. In certain embodiments, the amine is a commercially available dye known as Fast Violet B. In other embodiments, the amine is a commercially available dye known as Fast Blue RR. In other embodiments, the amine is a commercially available dye known as Fast Blue BB. In another embodiment, the amine may be 4-aminoacetanilide.

In one embodiment the aromatic amine may be an amine comprising two aromatic moieties linked by a —C(O)O— group. Each group may be substituted as described above for the oxygen-linked and the azo-linked amines. In one embodiment this amine is represented by the formula as well as positional isomers thereof.

The aromatic amine may be an amine comprising two aromatic moieties linked by an —$SO_2$— group. Each of the aromatic moieties can be substituted as described above for the oxygen-linked and the azo-linked amines. In one embodiment the linkage, in addition to —$SO_2$—, further contains an —NR— or specifically an —NH— group, so that the entire linkage is —$SO_2NR$— or —$SO_2NH$—. In one embodiment, this aromatic amine is represented by the structure of 4-amino-N-phenyl-benzenesulfonamide. A commercially available variation thereof is sulfamethazine, or N'-(4,6-dimethyl-2-pyrimidinyl)sulfanilamide (CAS #57-68-1), which is believed to be represented by the structure sulfamethazine as commercially available.

The aromatic amine may be a nitro-substituted aniline, which, can, likewise, bear the substituents as described above for the oxygen-linked and the azo-linked amines. Included are the ortho-, meta-, and para-substituted isomers of nitroaniline. In one embodiment the amine is 3-nitro-aniline.

The aromatic amine may also be an aminoquinoline. Commercially available materials include 3-aminoquinoline, 5-aminoquinoline, 6-aminoquinoline, and 8-aminoquinoline and homologues such as 4-aminoquinaldine.

The aromatic amine may also be selected from an aminobenzimidazole such as 2-aminobenzimidazole, an N,N-dialkylphenylenediamine such as N,N-dimethyl-1,4-phenylenediamine, and a ring-substituted benzylamine, with various substituents as described above. One such benzyl amine is 2,5-dimethoxybenzylamine.

The aromatic amine may, in general, contain one or more reactive (condensable) amino groups. A single reactive amino group is sometimes preferred. Multiple amino groups, as in the case of the above described N,N-dimethylphenylenediamines, may be useful as well, especially if they are reacted under relatively mild conditions so as to avoid excessive crosslinking or gellation of the polymer.

The above-described aromatic amines may be used alone or in combination with each other. The amine may also be used in combination with additional, aromatic or non-aromatic, e.g., aliphatic, amines, which, in one embodiment, comprise 1 to 8 carbon atoms. These additional amines may be included for a variety of reasons. Sometimes it may be desirable to incorporate an aliphatic amine in order to assure complete reaction of the acid functionality of the polymer, in the event that some residual acid functionality may tend to react incompletely with the relatively more bulky aromatic amine. Alternatively, the aliphatic amine may replace a portion of a more costly aromatic amine, while maintaining the majority of the performance of the aromatic amine. When a combination of aromatic and aliphatic amines are used, the amount of aliphatic amine is typically a minor amount compared with the amount of the aromatic amine, that is, less than 50% of the total amine present on a weight or molar basis, although higher amounts may be used, such as 70 to 130% or 90 to 110%. Exemplary amounts include 10 to 70 weight percent, or 15 to 50 weight percent, or 20 to 40 weight percent. Use of certain combinations of 4-phenoxyaniline with dimethylaminopropylamine within these ranges, for instance, may provide particularly good performance in terms of soot suspension. In certain embodiments, the reaction product may be functionalized with three or more different amines, for instance, with 3-nitroaniline, 4-(4-nitrophenylazo)aniline, and dimethylaminopropylamine.

Alternatively, amines with two or more reactive groups, especially primary groups, may be used in restricted amounts in order to provide an amount of branching or crosslinking to the polymeric composition. Suitable polyamines include ethylenediamine, diethyletriamine, propylenediamine, diaminocyclohexane, methylene-bis-cyclohexylamine, 2,7-diaminofluroene, ortho, meta, or para-xylenediamine, ortho, meta, or para-phenylenediamine, 4,4-oxydianiline, 1,5-, 1,8-, or 2,3-diaminonaphthalene, and 2,4-diaminotoluene. The soot-handling properties of the reaction products disclosed herein may be further enhanced when a minor amount of a branching or crosslinking polyamine is incorporated. The amount of incorporation, however, should be restricted to those low levels that do not lead to gel formation or insolubility of the polymer. Exemplary amounts include 1 to 15, or 3 to 10, or 7 to 9, weight percent based on the total amines used, or alternatively 0.1 to 1, or 0.2 to 0.6, or 0.3 to 0.5 weight percent based on the polymer. Suitable amounts may be calculated such that about 1 molecule of primary amine will react with one acid functionality per polymer chain, leaving the remaining acid functionality to react with the (other) aromatic amines. Alternatively, if the acid functionality is provided by a diacid such as maleic acid or anhydride, then 1 primary amine may be reacted with one maleic anhydride moiety (containing 2 acid groups) per polymer chain, thereby reacting with both acid groups by imide formation. The amount of the amine may, in certain embodiments, be a stoichiometric amount so as to react with the available carboxylic acid functionality on the polymer.

When component (iii) is a polyol, the polyol may selected from one or more polyol compounds containing 2 to 10 or 2 to 6 hydroxyl groups. Examples of a generic class of suitable polyol compounds include glycol, and glycerol. Examples of suitable polyol compounds include glycerol, erythritol, 2-hydroxymethyl-2-methyl-1,3-propanediol(trimethylolethane), 2-hydroxymethyl-2-ethyl-1,3-propanediol(trimethylolpropane), 1,2,4-hexanetriol, ethylene glycol, propylene glycol, butylene glycol, pentaerythritol, dipentaerythritol, mannitol, sorbitol or mixtures thereof. When component (iii) is a polyol, the polyol may be is caped with an amine or polyamine.

When component (iii) is an aminoalcohol, the aminoalcohol may be selected from one or more of ethanolamine, isopropanolamine, diethanolamine, triethanolamine, diethylethanolamine, dimethylethanolamine, dibutylethanolamine, 3-amino-1,2-propanediol, serinol, 2-amino-2-methyl-1,3-propanediol, tris(hydroxymethyl)-aminomethane, 1-amino-1-deoxy-D-sorbitol, diethanol amine; diisopropanolamine, N-methyl-N,N-diethanol amine, triethanolamine, N,N,N',N'-tetrakis(2-hydroxypropyl)ethylenediamine, 2-amino-2-methyl-1-propanol, 2-dimethylamino-methyl-1-propanediol, 2-amino-2-ethyl-1,3-propanediol, 2-amino-2-methyl-1,3-propanediol, 2-amino-1-butanol or mixtures thereof. In one embodiment the aminoalcohol is ethanolamine.

The reaction product may be made by reacting components (i), (ii), and (iii) in a one-step process. A one-step process generally involves adding all of the reactants into a vessel and reacting them to form a product has a mole ratio of (i):(ii) ranging from about 1:10 to about 5:1. Further a person skilled in the art will appreciate that the reaction product includes (i)+(ii)+(iii). Components (i)+(ii)+(iii) may also react to give a by-product by reacting (ii)+(iii) and/or (i)+(iii). However, a person skilled in the art will also appreciate that (ii)+(iii) and/or (i)+(iii) may form as intermediates in the formation of the functionalized copolymer reaction product.

The reaction may be carried out at temperatures ranging from about 20° C. to about 300° C. For example, the reaction may be carried out at a temperature ranging from about 100° C. to about 220° C. or from about 145° C. to about 200° C. Relatively low temperature reactions may be conducted in the presence of an organic solvent and may include a step of removing the product and solvent from one another upon termination of the reaction. In several embodiments the process may be carried out for a period of time in the range of 30 seconds to 48 hours, 2 minutes to 24 hours, 5 minutes to 16 hours, or 30 minutes to 4 hours. In several embodiments the process may be carried out at a pressure in the range of 86.4 kPa to 266 kPa (650 mm Hg to 2000 mm Hg), 91.8 IcPa to 200 kPa (690 mm Hg to 1500 mm Hg) or 95.1 IdPa to 133 kPa (715 mm Hg to 1000 mm Hg).

In one embodiment the reaction product is believed to be formed by crosslinking of (i) an acylated alkylacrylate copolymer having a number average molecular weight of more than about 5000; and (ii) a hydrocarbyl acylating agent having a number average molecular weight of about 350 to about 5000 with (iii) a compound selected from the group consisting of a polyamine; a polyol; and an aminoalcohol. The component (iii) is believed to serve as a crosslinking agent by condensing or otherwise reacting, at least in part, with the acylating functionality of molecules of both components (i) and (ii)

A person skilled in the art will appreciate that the mole ratio of (i):(ii) may be modified such that amino and/or hydroxy groups sufficiently crosslink components (i) and (ii) to ensure the reaction product exhibits dispersant and viscosity index improving properties. If the degree of crosslinking or if the molecular weight of the product is too high the product may form a gel and becomes oil-insoluble. Alternatively if the degree of crosslinking or molecular weight is too low, the reaction product typically has modest viscosity modifying properties and modest thickening power.

According to another embodiment of the disclosure, the reaction product of (i), (ii) and (iii) may be post-treated with various post-treating agents known in the lubrication art, such as boric acid, glycolic acid, phosphorus-containing compounds, dimercaptothiadiazole, formaldehyde, tungstic acid, molybdic oxide or acid, titanium compounds, and the like.

The disclosure also provides novel lubricant compositions comprising an oil of lubricating viscosity and an effective amount of the functionalized polyalkylacrylate copolymer reaction product described above, in the form of additive concentrates or finished lubricants. The lubricating fluid compositions may include, e.g., crankcase oils, gear oils, EO, ATFs, and industrial/AW hydraulic fluids. Such lubricant compositions may be used to lubricate internal combustion engines, engine transmissions, gears and other mechanical devices and components. The reaction products described herein may effectively extend the service time available between oil drains in a vehicle having an engine lubricated with a lubrication composition containing the reaction products, among other benefits and advantages. Embodiments of the disclosure are also directed to engines lubricated with these improved lubricating compositions and compounds.

The functionalized polyalkylacrylate copolymer product may be diluted in an oil of lubricating viscosity to provide a lubricant. The product may be beneficially used directly, or alternatively as pre-diluted in base oil in concentrate form, as an additive for lubricants. In other embodiments, the reaction product may be used in lubrication compositions for one or more functions including as a dispersant, viscosity index improver, antioxidant, film formation improver, deposit controller, as well as other functions. However, the reaction product is particularly useful as a dispersant.

The reaction products disclosed herein find utility in lubricating oil compositions which employ base oil in which the additives are dissolved or dispersed in amount sufficient to provide the desired functionality. Such base oils may be natural, synthetic or mixtures thereof Base oils suitable for use include those described, for example, in U.S. Pat. Nos. 6,255, 261 B1 and 6,107,257, which descriptions are incorporated herein by reference.

Base oils suitable for use in preparing the lubricating oil compositions described herein include those conventionally employed as crankcase lubricating oils for spark-ignited and compression-ignited internal combustion engines, such as automobile and truck engines, marine and railroad diesel engines, and the like. The internal combustion engines which may be advantageously lubricated with crankcase lubricating oils containing the unique reaction product additives set forth herein include gasoline, gasohol, and diesel fuel powered engines. The diesel engines that may be beneficially lubricated include, but are not limited to, heavy duty diesel engines, including those equipped with exhaust gas recirculation (EGR) systems.

Among other advantages, these additives have been observed in performance tests to have good dispersancy, low temperature properties, thickening efficiency, and antioxidancy properties.

Reaction product additives, described herein, may also impart improved CCS low temperature engine properties and sludge dispersancy. Enhanced dispersancy and fuel economy improvement is expected to be achieved for most standard engine performance tests using the reaction product additives described herein. The cold crank simulator (CCS) test (ASTM D-5293) is a standard test used to determine a formulation's low temperature properties. The CCS test determines the apparent viscosity of lubricants at low temperatures and high shear rates. The lower a lubricant's cold crank viscosity, the easier an engine will turn over in cold temperatures. For example, 10 W motor oils are tested at −25° C. and must have a viscosity below 7000 cP to pass. Viscosity of lubricants under these conditions is directly related to engine cranking and startability. Oils treated with reaction product additives according to the disclosed embodiments may pass the CCS specification.

Passenger car motor oils (PCMO) typically are required to aid in a vehicle's sludge control. The Sequence VG test corresponds to ASTM D6593-04—"Standard Test Method for Evaluation of Automotive Engine Oils for Inhibition of Deposit Formation in a Spark-Ignition Internal Combustion Engine Fueled with Gasoline and Operated Under Low-Temperature Light-Duty Conditions." The Sequence VG test method has been correlated with vehicles used in stop-and-go service prior to 1996, particularly with regard to sludge and varnish formation. It is one of the test methods required to evaluate oils intended to satisfy the API SL performance category. The Sequence VG test evaluates a lubricant's ability to prevent sludge and varnish formation. The Sequence VG test is a replacement test for Sequence VE, ASTM D 5302, sludge and varnish. Moderate temperature taxicab service, urban and suburban delivery service, or job commuting service is simulated. The Sequence VG lubricant test is an engine dynamometer test that duplicates the Sequence VE application, except that wear is not evaluated.

Advantageous results may also be achieved by employing the additive mixtures of the disclosed embodiments in base oils conventionally employed in and/or adapted for use as crankcase oils, power transmitting fluids, heavy duty hydraulic fluids, power steering fluids and the like. Gear lubricants, industrial oils, pump oils and other lubricating oil compositions may also benefit from the incorporation therein of the additive mixtures of the disclosed embodiments.

The finished lubricating oil composition may include other additives in addition to the reaction product described above. For instance, these lubricating oil formulations may contain additional additives that will supply the characteristics that are required in the formulations. Among these types of additives are included additional dispersants, viscosity index improvers, antioxidants, corrosion inhibitors, detergents, pour point depressants, antiwear agents, antifoaming agents, demulsifiers, extreme pressure agents, seal swell agents, and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the total amount of reaction product is usually be employed in the form of a 10 to 50 wt. % concentrate, for example, in a lubricating oil fraction. In one embodiment, the total amount of the reaction product in finished lubricating oil is from about 0.1 weight percent to about 20 weight percent, particularly about 1 weight percent to about 5.0 weight percent, and more particularly about 0.5 weight percent to about 2.5 weight percent.

The reaction product described above will generally be used in admixture with a lube oil base stock, comprising an oil of lubricating viscosity, including natural lubricating oils, synthetic lubricating oils and mixtures thereof. Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this invention include one of any number of commonly used synthetic hydrocarbon oils, which include, but are not limited to, poly-alpha-olefins, alkylated aromatics, alkylene oxide polymers, copolymers, terpolymer, interpolymers and derivatives thereof here the terminal hydroxyl groups have been modified by esterification, esterification etc, esters of dicarboxylic acids and silicon-based oils.

The present disclosure is further directed to a method of extending lubricant drain intervals in a vehicle is contemplated. Said method comprises adding to and operating in the crankcase of the vehicle the lubricating oil composition described above.

The following examples are given to illustrate various aspects of the disclosed embodiments and are not intended to limit the embodiments as set forth herein.

Example 1

Butyl methacrylate (74.7 g), lauryl methacrylate (513.0 g), cetyl methacrylate (27.0 g), maleic anhydride (45.0 g), lauryl mercaptan (0.81 g), and process oil (238.59 g) were charged to a two liter reaction vessel equipped with nitrogen atmosphere and two mixing impellers rotating at about 300 rpm. The reaction mixture was heated to about 79° C. and 0.9 g of azoisobutyronitrile (AIBN) was added to the mixture. The reaction was allowed to proceed for about 4 hours at about 79° C. followed by 1.5 hours at about 104° C. Additional process oil (753.53 g) was added and the mixture was held at 104° C. for 1 hour. Any unreacted maleic anhydride and free radical initiator were removed by heating the reaction mass to 120° C. and applying a vacuum. The acylated methacrylate copolymer thus obtained had an Mw=266,092, Mn=110,308, and Total acid number=0.292.

Example 2

Copolymer (106 g) obtained from Example 1, 112.5 g of a polyisobutenyl succinic anhydride (Mn of approx. 950 and acid number 0.72), and 505.5 g of process oil were charged to a reaction vessel equipped with nitrogen sub-surface and distill condenser. The mixture was heated about 100° C. and 9.9 g of a mixture of polyethylenepolyamines was added dropwise over a period of about 30 minutes. The temperature of the reaction mixture was then raised to 160° C. and held for 4 hours. The reaction mixture was stripped under vacuum for 1 hour. The resulting product had 0.51 wt. % N and 8.7 total base number (TBN).

Example 3

Butyl methacrylate (110.1 g), lauryl methacrylate (570.0 g), cetyl methacrylate (3.2 g), maleic anhydride (50.0 g), lauryl mercaptan (1.61 g), and process oil (264.7 g) were charged to a two liter reaction vessel equipped with nitrogen atmosphere and two mixing impellers rotating at about 300 rpm. The reaction mixture was heated to about 84° C. and 1.0 g of azoisobutyronitrile (AIBN) was added to the mixture. The reaction was allowed to proceed for about 4 hours at about 84° C. followed by 1.5 hours at about 104° C. Additional 471.6 g of process oil was added to the mixture and the mixture was held at 104° C. for 1 hour. Any unreacted maleic anhydride and free radical initiator were removed by heating the reaction mass to 120° C. and applying a vacuum. The acylated methacrylate copolymer thus obtained had an Mw=150,602, Mn=70,325, and Total acid number=0.299.

Example 4

Copolymer (231.6 g) obtained from Example 3, 333.4 g of a polyisobutenyl succinic anhydride (Mn=approx. 950 and acid number=0.72), and 780 g of process oil were charged to a reaction vessel equipped with nitrogen sub-surface and distill condenser. The mixture was heated about 100° C. and 30.2 g of a mixture of polyethylenepolyamines was added dropwise over a period of about 30 minutes. The temperature of the reaction mixture was then raised to 160° C. and held for 4 hours. The mixture was stripped under vacuum for 1 hour. The resulting product had 0.83 wt. % N and 18.9 TBN.

Example 5

Butyl methacrylate (124.6 g), lauryl methacrylate (807.8 g), cetyl methacrylate (4.2 g), maleic anhydride (88.2 g), lauryl mercaptan (3.5 g), and process oil (364.0 g) were charged to a two liter reaction vessel equipped with nitrogen atmosphere and two mixing impellers rotating at about 300 rpm. The reaction mixture was heated to about 84° C. and 3.5 g of azoisobutyronitrile (AIBN) was added to the mixture. The reaction was allowed to proceed for about 4 hours at about 84° C. followed by 1.5 hours at about 104° C. Any unreacted maleic anhydride and free radical initiator were removed by heating the reaction mass to 120° C. and applying a vacuum. The acylated methacrylate copolymer thus obtained had an Mw=45,333, Mn=25,815, and Total acid number=0.571.

Example 6

Copolymer (168 g) obtained from Example 5, 450 g of a polyisobutenyl succinic anhydride (Mn=approx. 950 and acid number 0.72), and 652 g of process oil were charged to a reaction vessel equipped with nitrogen sub-surface and distill condenser. The mixture was heated about 100° C. and 39.6 g of a mixture of polyethylenepolyamines was added dropwise over a period of about 30 minutes. The temperature of the reaction mixture was then raised to 160° C. and held for 4 hours. The mixture was stripped under vacuum for 1 hour. The resulting product had 1.07 wt. % N and 21.9 TBN.

Example 7

Butyl methacrylate (110.0 g), lauryl methacrylate (570.0 g), cetyl methacrylate (3.0 g), maleic anhydride (50.0 g), lauryl mercaptan (1.6 g), and process oil (264.7 g) were charged to a two liter reaction vessel equipped with nitrogen atmosphere and two mixing impellers rotating at about 300 rpm. The reaction mixture was heated to about 84° C. and 1.0 g of azoisobutyronitrile (AIBN) was added. The reaction was allowed to proceed for about 4 hours at about 84° C. followed by 1.5 hours at about 104° C. Additional 471.6 g of process oil was added and the mixture was held at 104° C. for 1 hour. Any unreacted maleic anhydride and free radical initiator were removed by heating the reaction mass to 120° C. and applying a vacuum. The acylated methacrylate copolymer thus obtained had an Mw=142,578, Mn=70,628, and Total acid number=0.313

Example 8

Copolymer (280 g) obtained from Example 7, 269.3 g of polyisobutenyl succinic anhydride (Mn=approx. 1300 and acid number 1.07) derived from high vinylidene polyisobutylenes, and 1642.7 g of process oil were charged to a reaction vessel equipped with nitrogen sub-surface and distill condenser. The mixture was heated about 100° C. and 36.4 g of a mixture of polyethylenepolyamines was added dropwise over a period of about 30 minutes. The temperature of the reaction mixture was then raised to 160° C. and held for 4 hours. The mixture was stripped under vacuum for 1 hour. The resulting product had 0.63 wt. % N and 13.1 TBN.

Example 9

Copolymer (280 g) obtained from Example 7, 90 g of polyisobutenyl succinic anhydride (Mn=approx. 2100 and acid number 0.732) derived from high vinylidene polyisobutylenes, and 474.4 g of process oil were charged to a reaction vessel equipped with nitrogen sub-surface and distill condenser. The mixture was heated about 100° C. and a meltblend of 7.1 g of 1,3-phenylenediamine (MW=108.0) and 7.1 g of ethoxylated lauryl alcohol (SURFONIC® L24-2, obtained from Huntsman Chemical Company) was poured into the reaction mixture. The temperature of the reaction mixture was then raised to 160° C. and held for 4 hours The mixture was stripped under vacuum for 1 hour. The resulting product had 0.2 wt. % N.

Example 10

Butyl methacrylate (162.0 g), lauryl methacrylate (337.3 g), cetyl methacrylate (2.7 g), maleic anhydride (36.7 g), lauryl mercaptan (0.36 g), and process oil (360.0 g) were charged to a two liter reaction vessel equipped with nitrogen atmosphere and two mixing impellers rotated at about 300 rpm. The reaction mixture was heated to about 79° C. and 0.9 g of azoisobutyronitrile (AIBN) was added. The reaction was allowed to proceed for about 4 hours at about 79° C. followed by 1.5 hours at about 104° C. Additional 450 g of process oil was added and held at 104° C. for 1 hour. Any unreacted maleic anhydride and free radical initiator were removed by heating the reaction mass to 120° C. and applying a vacuum. The acylated methacrylate copolymer thus obtained had an Mw=307,399, Mn=130,897 and Total acid number=0.259.

Example 11

Copolymer (95.8 g) obtained from Example 10, 24.7 g of polyisobutenyl succinic anhydride (Mn=approx. 1300 and acid number 1.07) derived from high vinylidene polyisobutylenes, and 423.2 g of process oil were charged to a reaction vessel equipped with nitrogen sub-surface and distill condenser. The mixture was heated about 100° C. and a melt-blend of 2.8 g of 1,3-phenylenediamine (MW=108.0) and 2.8 g of ethoxylated lauryl alcohol (SURFONIC® L24-2, obtained from Huntsman Chemical Company) was poured into the reaction. The temperature of the reaction mixture was then raised to 160° C. and held for 4 hrs. The mixture was stripped under vacuum for 1 hour. The resulting product had 0.1 wt. % N.

Example 12

Copolymer (94.5 g) obtained from Example 5, 170 g of a polyisobutenyl succinic anhydride (Mn=approx. 1300 and acid number 1.07) derived from high vinylidene polyisobutylenes, and 710 g of process oil were charged to a reaction vessel equipped with nitrogen sub-surface and distill condenser. The mixture was heated about 100° C. and 22.3 g of a mixture of polyethylenepolyamines was added dropwise over a period of about 30 minutes. The temperature of the reaction mixture was then raised to 160° C. and held for 4 hours. The mixture was then cooled to about 90° C. and 3.3 g of tolyl triazole, 9.0 g of boric acid and 6.1 g of 70% phosphorus acid were added. The mixture was heated to about 140° C. and then held under vacuum for about 2 hours. The resulting product had 0.95 wt. % N, 0.1 wt. % boron, 0.16 wt. % phosphorus, 19.7 TBN, and 4.7 TAN.

Example 13

Lubricating Compositions

Formulation 1 in Table I was a 5W-30 oil that was prepared by mixing a base oil, a non-dispersant olefinic viscosity modifier, polyisobutenyl succinimide dispersants, and a core pack containing a mixture of detergents, antioxidants, sulfurized olefins, zinc dithiophosphates, friction modifiers, and defoamer. Formulations 2 and 3 included the products of Examples 8 and 9 instead of the polyisobutenyl succinimide dispersants to provide approximately equal total active species.

TABLE I

| Components | Formulation 1 | Formulation 2 | Formulation 3 |
|---|---|---|---|
| Core Pack A | 5.6% | 5.6% | 5.6% |
| Polyisobutenyl succinimide Dispersant A | 3.2% | — | — |
| Polyisobutenyl succinimide Dispersant B | 1.2% | — | — |
| Example 8 | — | 11.8% | — |
| Example 9 | — | — | 9.4% |
| VI Improver A | 8.5% | 5.0% | 5.5% |
| Motiva 5 cst TEXHVI base oil | 81.5% | 77.46% | 79.5% |

TABLE II

| | Formulation 1 | Formulation 2 | Formulation 3 |
|---|---|---|---|
| KV @ 100° C. | 10.41 | 10.67 | 10.91 |
| CCS (−30° C.) | 5422 | 5156 | 4984 |

The results in Table II demonstrated that product of the disclosed embodiments reduced the amount of the olefinic viscosity modifier that was needed to provide comparable kinematic viscosity (KV) and also reduced the low temperature viscometircs (CCS) which is highly desirable in a lubricating composition.

Formulation 4 in Table III was a 15W-40 oil that was prepared by mixing a base oil, a non-dispersant olefinic viscosity modifier, polyisobutenyl succinimide dispersants derived from high vinylidene polyisobutylene, and a core pack containing a mixture of detergents, ashless antioxidants, zinc dithiophosphates, friction modifiers, and defoamer. In formulations 5 and 6, part of the non-dispersant olefinic viscosity modifier was replaced with the product of examples 8 and 9 of the disclosed embodiments.

The film formation properties of the lubricating fluids were determined utilizing a High Frequency Reciprocating Rig (HFRR) (see SAE 2002-01-2793 "Film Formation Properties of Polymers in the Presence of Abrasive Contaminants" by Mark T. Devlin et al.). In this test a steel ball oscillates across a steel disk, which is immersed in lubricant. An electrical current runs through the ball and disk. When a boundary film is formed the ball and disk are separated and the current running between the ball and disk is reduced and recorded as a percent resistance. The higher the percent resistance the more tenacious the boundary film.

For the HFRR film results presented here in Table IV, 6% carbon black was added to the fluids and 1-2 mL of the fluids placed in a HFRR cell. During the test, the ball was oscillated across the disk at a frequency of 20 Hz over a 1 mm path. A load of 0.1 N was applied between the ball and the disk during the test which lasts for 10 minutes. The formation of boundary film was measured throughout the 10 minute test and the average film measurement (percent resistance) was reported.

TABLE III

| Components | Formulation 4 | Formulation 5 | Formulation 6 |
|---|---|---|---|
| Core pack B | 6.9% | 6.9% | 6.9% |
| Polyisobutenyl succinimide Dispersant C | 4% | 4% | 4% |
| Example 8 | — | 10% | — |
| Example 9 | — | — | 8% |
| VI Improver B | 10.5% | 5% | 5% |
| 6 STAR Motiva base oil | 78.6% | 74.1% | 76.1% |

TABLE IV

| | Formulation 4 | Formulation 5 | Formulation 6 |
|---|---|---|---|
| KV @ 100° C. | 15.76 | 15.31 | 15.63 |
| HFRR @ 6% Carbon Black (average of 2 runs) | 17% | 52% | 81% |

Formulations 5 and 6 including reaction products according to the disclosed embodiments provided a dramatic increase in film strength as measured by HFRR over Formulation 4 for lubricants having substantially the same kinematic viscosity. Accordingly, reaction products according to the disclosure are expected to exhibit greater soot handling capabilities compared to conventional dispersants.

At numerous places throughout this specification, reference has been made to a number of U.S. patents and publications. All such cited documents are expressly incorporated in full into this disclosure as if fully set forth herein.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A crosslinked reaction product obtained by
A) mixing (i) an acylated alkylacrylate copolymer having a number average molecular weight ranging from about 5,000 to about 500,000, wherein the acylated alkylacrylate copolymer comprises from about 0.1 to about 20 weight percent of monomer units derived from an unsaturated anhydride monomer; with
ii) a hydrocarbyl acylating agent having a number average molecular weight ranging from about 500 to about 5000 to obtain a mixture of component (i) and component (ii); and
crosslinking the mixture of component (i) and component (ii) with component (iii) a compound selected from the group consisting of (a) a polyamine; (b) a polyol; and (c) an aminoalcohol to provide a crosslinked polyalkylacrylate copolymer,
wherein a mole ratio of component (i) to component (ii) in the mixture ranges from about 1:10 to about 5:1.

2. The reaction product of claim 1, wherein the acylated alkylacrylate copolymer has a number average molecular weight ranging from about 50,000 to about 250,000.

3. The reaction product of claim 1, wherein the polyamine is selected from the group consisting of an aliphatic amine, an aromatic amine, and mixtures thereof.

4. The reaction product of claim 1, wherein the reaction product comprises a dispersant.

5. The reaction product of claim 1, wherein the reaction product comprises a viscosity index improver.

6. The reaction product of claim 1, wherein the reaction product exhibits low temperature properties suitable for use in lubricants and power transmission fluids.

7. The reaction product of claim 1, wherein the hydrocarbyl acylating agent comprises a polyalkylene succinic acid or anhydride.

8. The reaction product of claim 7, wherein the polyalkylene of the polyalkylene succinic acid or anhydride has a number average molecular weight ranging from about 900 to about 3000.

9. The reaction product of claim 1, wherein the polyol is selected from the group consisting of glycerol, erythritol, 2-hydroxymethyl-2-methyl-1,3-propanediol (trimethylolethane), 2-hydroxymethyl-2-ethyl-1,3-propanediol (trimethylolpropane), 1,2,4-hexanetriol, ethylene glycol, propylene glycol, butylene glycol, pentaerythritol, dipentaerythritol, mannitol, sorbitol, and mixtures thereof.

10. The reaction product of claim 1, wherein the aminoalcohol is selected from the group consisting of ethanolamine, isopropanolamine, diethanolamine, triethanolamine, diethylethanolamine, dimethylethanolamine, dibutylethanolamine, 3-amino-1,2-propanediol, serinol, 2-amino-2-methyl-1,3-propanediol, tris(hydroxymethyl)-aminomethane, 1-amino-1-deoxy-D-sorbitol, diethanol amine, diisopropanolamine, N-methyl-N,N-diethanol amine, triethanolamine, N,N,N',N'-tetrakis(2-hydroxypropyl)-ethylenediamine, 2-amino-2-methyl-1-propanol, 2-dimethyl-amino-methyl-1-propanediol, 2-amino-2-ethyl-1,3-propanediol, 2-amino-2-methyl-1,3-propanediol, 2-amino-1-butanol, and mixtures thereof.

11. The reaction product of claim 1, wherein the alkylacrylates have the general structure:

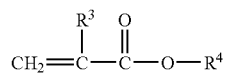

where $R^3$ is hydrogen or a C1-C5 alkyl group, and $R^4$ is a non-substituted or substituted C1 to about C30 alkyl group.

12. The reaction product of claim 1, wherein the alkylacrylates have the general structure:

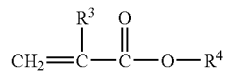

where $R^3$ is hydrogen or a C1-C5 alkyl group, and $R^4$ is a non-substituted or substituted C1 to about C30 alkyl group with the proviso that $R^4$ is selected effective to provide said first, second and third subgroups of alkyacrylate monomers in said molar ratio.

13. The reaction product of claim 11, wherein $R^3$ is methyl.

14. The reaction product of claim 1, wherein the acylated alkylacrylate copolymer comprises monomeric units derived from about 99.9 to about 80 weight percent of alkylacrylate monomers.

15. The reaction product of claim 1, wherein component (iii) comprises a polyol, wherein the polyol is capped with an amine or polyamine.

16. The reaction product of claim 1, wherein the reaction product is post-treated with a post-treating agent selected from the group consisting of boric acid, glycolic acid, phosphorus-containing compounds, dimercaptothiadiazole, formaldehyde, molybdenum oxide or acid, tungsten oxide or acid, and titanium compounds.

17. The reaction product of claim 1, wherein component (iii) comprises a polyalkylene polyamine selected from the group consisting of polyethylene polyamine and polyethyleneimine.

18. The reaction product of claim 1, wherein component (iii) comprises a polyalkylene polyamine selected from the group consisting of diethylenetriamine (DETA), triethylenetetramine (TETA), tetraethylenepentamine (TEPA), pentaethylene-hexamine (PEHA), dipropylenetriamine (DPTA), bis(hexamethylene)triamine, 1,3,6-trisaminomethylcyclohexane (TMAH), trimethylhexamethylenediamine (TMD), diethylaminopropylamine (DEAPA), 1,4-bis(3-aminopropyl)piperazine, ethylene diamine, dimethylamino propylamine, N-hydroxyethyl ethylenediamine, bis-aminopropyl piperazine, and mixtures thereof.

19. The reaction product of claim 1, wherein component (iii) comprises an aromatic polyamine selected from the group consisting of phenylene diamines, N-phenyl-1,4-phenylenediamine, N-phenyl-1,3-phenylendiamine, N-phenyl-1,2-phenylene-diamine, 4,4-diaminodiphenylamine, and mixtures thereof.

20. A lubricant composition comprising a major amount of base oil of lubricating viscosity and a minor amount of the reaction product of claim 1.

21. The lubricant composition of claim 20, wherein the reaction product comprises a soot-handling dispersant.

22. The lubricant composition of claim 20, wherein the reaction product comprises a dispersant-viscosity index improver suitable for improving low temperature properties of the lubricant composition.

23. The lubricant composition of claim 20, wherein the reaction product of claim 1 is present in the composition in amount of from about 0.5 weight percent to about 25 weight percent.

24. The lubricant composition of claim 23, wherein the oil of lubricating viscosity is selected from the group consisting of Group I oils, Group II oils, Group III oils, Group IV oils, synthetic oils, and mixtures thereof.

25. An additive concentrate comprising, on an active ingredient basis, 20 to 90 weight percent of a carrier or diluent oil and from about 10 to about 80 weight percent of the reaction product of claim 1.

26. A method of making a copolymer comprising reacting a mixture comprising component (i) an acylated alkylacrylate copolymer having a number average molecular weight ranging from about 5,000 to about 500,000; and component (ii) a hydrocarbyl acylating agent having a number average molecular weight ranging from about 500 to about 5000; with component (iii) a compound selected from the group consisting of (a) a polyamine; (b) a polyol; and (c) an aminoalcohol to provide a polyalkylacrylate copolymer that is crosslinked to component (ii) with component (iii), wherein a mole ratio of component (i) to component (ii) in the mixture ranges from about 1:10 to about 5:1, and wherein the acylated alkylacrylate copolymer comprises from about 0.1 to about 20 weight percent of monomer units derived from an unsaturated anhydride monomer.

27. The method of claim 26, wherein the mixture of (i) and (ii) are reacted with (iii) at a temperature ranging from about 20° C. to about 160° C. under an inert atmosphere.

28. The method of claim 26, wherein the acylated alkylacrylate copolymer has a number average molecular weight ranging from about 50,000 to about 250,000.

29. The method of claim 26, wherein the polyamine is selected from the group consisting of aliphatic amines, aromatic amines, and mixtures thereof.

30. The method of claim 26, wherein the hydrocarbyl acylating agent comprises a polyalkylene succinic acid or anhydride.

31. The method of claim 30, wherein the polyalkylene of the polyisobutylene succinic acid or anhydride has a weight average molecular weight ranging from about 1000 to about 3000.

32. The method of claim 26, wherein the polyol is selected from the group consisting of glycerol, erythritol, 2-hydroxymethyl-2-methyl-1,3-propanediol (trimethylolethane), 2-hydroxymethyl-2-ethyl-1,3-propanediol (trimethylolpropane), 1,2,4-hexanetriol, ethylene glycol, propylene glycol, butylene glycol, pentaerythritol, dipentaerythritol, mannitol, sorbitol, and mixtures thereof.

33. The method of claim 26, wherein the aminoalcohol is selected from the group consisting of ethanolamine, isopropanolamine, diethanolamine, triethanolamine, diethylethanolamine, dimethylethanolamine, dibutylethanolamine, 3-amino-1,2-propanediol, serinol, 2-amino-2-methyl-1,3-propanediol, tris(hydroxymethyl)-aminomethane, 1-amino-1-deoxy-D-sorbitol, diethanol amine, diisopropanolamine, N-methyl-N,N-diethanol amine, triethanolamine, N,N,N',N'-tetrakis(2-hydroxypropyl)-ethylenediamine, 2-amino-2-methyl-1-propanol, 2-dimethyl-amino-methyl-1-propanediol, 2-amino-2-ethyl-1,3-propanediol, 2-amino-2-methyl-1,3-propanediol, 2-amino-1-butanol, and mixtures thereof.

34. The method of claim 26, wherein the alkylacrylates have the general structure:

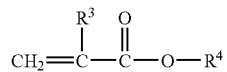

where $R^3$ is hydrogen or a C1-C5 alkyl group, and $R^4$ is a non-substituted or substituted C1 to about C30 alkyl group with the proviso that $R^4$ is selected effective to provide said first, second and third subgroups of alkylacrylate monomers in said molar ratio.

35. The method of claim 34, wherein $R^3$ is methyl.

36. The method of claim 26, wherein the acylated alkylacrylate copolymer comprises monomeric units derived from about 99.9 to about 80 weight percent of alkylacrylate monomers.

37. The method of claim 26, wherein component (iii) comprises a polyol, further comprising capping the polyol with an amine or polyamine.

38. The method of claim 26, further comprising post-treating the functionalized polyalkylacrylate copolymer with a post-treating agent selected from the group consisting of boric acid, glycolic acid, a phosphorus-containing compound, and a dimercaptothiadiazole.

39. The method of claim 26, wherein component (iii) comprises a polyalkylene polyamine selected from the group consisting of diethylenetriamine (DETA), triethylenetetramine (TETA), tetraethylenepentamine (TEPA), pentaethylene-hexamine (PEHA), dipropylenetriamine (DPTA), bis(hexamethylene)triamine, 1,3,6-trisaminomethylcyclohexane (TMAH), trimethylhexamethylenediamine (TMD), diethylaminopropylamine (DEAPA), 1,4-bis(3-aminopropyl)piperazine, ethylene diamine, dimethylamino propylamine, N-hydroxyethyl ethylenediamine, bis-aminopropyl piperazine, and mixtures thereof.

40. The method of claim 26, wherein component (iii) comprises an aromatic polyamine selected from the group consisting of phenylene diamines, N-phenyl-1,4-phenylenediamine, N-phenyl-1,3-phenylendiamine, N-phenyl-1,2-phenylenediamine, and 4,4-diaminodiphenylamine, and mixtures thereof.

* * * * *